United States Patent [19]

Pincent

[11] Patent Number: 4,809,546
[45] Date of Patent: Mar. 7, 1989

[54] METHOD AND DEVICE FOR MEASURING THE HEIGHT OF A PRODUCT IN SURROUNDINGS HAVING A THERMAL BEHAVIOUR DIFFERENT FROM THAT OF THE PRODUCT TO BE MEASURED, PARTICULARLY FOR MEASURING THE HEIGHT OF SNOW

[75] Inventor: Bernard Pincent, Chevreuse, France

[73] Assignee: Simecsol, Paris, France

[21] Appl. No.: 85,519

[22] Filed: Aug. 14, 1987

[30] Foreign Application Priority Data

Aug. 19, 1986 [FR] France .............................. 86 11856

[51] Int. Cl.⁴ .............................................. G01W 1/14
[52] U.S. Cl. ...................................... 73/170 R; 73/295
[58] Field of Search ...................... 73/295, 170 R, 292, 73/290 B, 171

[56] References Cited

U.S. PATENT DOCUMENTS

| 4,065,967 | 1/1978 | Beeston .................................. 73/295 |
| 4,425,795 | 1/1984 | Albrecht et al. ..................... 73/295 |
| 4,720,997 | 1/1988 | Doak et al. ............................ 73/295 |

FOREIGN PATENT DOCUMENTS 124076 12/1981 Japan .
574105 3/1976 Switzerland .

Primary Examiner—Ronald O. Woodiel
Attorney, Agent, or Firm—Shenier & O'Connor

[57] ABSTRACT

A measuring rod carrying a plurality of temperature sensors distributed over its height is placed in such a way that at least its lower part is embedded in the product of which the height is to be measured. Signals produced by the sensors and representing the temperatures in the locations of the various sensors on the rod are picked up and the variation in time of the picked-up signals is monitored in order to identify the lowest situated sensor which delivers a signal of which the variation is higher than a predetermined threshold.

8 Claims, 3 Drawing Sheets

METHOD AND DEVICE FOR MEASURING THE HEIGHT OF A PRODUCT IN SURROUNDINGS HAVING A THERMAL BEHAVIOUR DIFFERENT FROM THAT OF THE PRODUCT TO BE MEASURED, PARTICULARLY FOR MEASURING THE HEIGHT OF SNOW

BACKGROUND OF THE INVENTION

The present invention relates to the measurement of the height of a product in surroundings having a thermal behaviour which differs from that of the product.

One particular application of the invention s for measuring the height of snow. However, the invention can also be used for measuring the height of other products, such as sand or other pulverulent or liquid materials of which the thermal behaviour (conductivity, heat capacity, temperature stability, ... ) contrasts with that of the surroundings, i.e. for example, products which, in bulk, constitute "thermal absorbers" by opposition to gaseous surroundings (such as the atmosphere) presenting quick variations of temperature in time and in space.

OBJECT AND SUMMARY OF THE INVENTION

The fact of knowing the height of the snow in various locations of a geographical area is necessary for the control of roadways or winter sport resorts. Such information should be obtainable without having to send people to the different locations where measurements should be made, and it is precisely the object of the present invention to provide automatic measuring means which are instantaneous and reliable and the installation and maintenance of which imply no very high investments.

For this purpose, the invention proposes a method for measuring the height of a product of low conductivity which is piled on a surface, and more particularly for measuring the height of snow piled on the ground, which process consists in:

providing a measuring rod of which at least the lower part is designed to be embedded in the product of which the height is to be measured, said rod being provided with a plurality of temperature sensors distributed over the height of the rod, picking up, at time intervals, the signals delivered by the sensors and representing the temperatures prevailing at the locations of the different sensors on the rod, and monitoring the variation in time of the picked up signals in order to identify the lowest situated sensor which produces a signal of which the variation exceeds a threshold.

Experience has shown that the snow is a very efficient "thermal absorber" and that a signal delivered by a temperature sensor placed in the snow only shows very low and very slow variations. On the contrary, the signal produced by a sensor placed in the atmosphere above the snow, shows quick variations (appearance and disappearance of the sun, wind) often of wide amplitude (temperature variation between the night and a sunny day in winter).

The method proposed by the invention therefore basically consists in controlling the variation in time of temperatures measured at different heights. Such control can be achieved by monitoring the instant speed of temperature variation or the amplitude of the temperature variation over a given period of time. Preferably, a statistical processing is made of the temperature values recorded periodically over a predetermined period, by monitoring the dispersion of the measured values.

The method according to the invention thus makes it possible to know the height of the snow (or of any other product f low heat conductivity) by using simple and inexpensive means, and with an accuracy which is quite sufficient for the use normally made of the information obtained (opening or closing of roadways or of ski runs, starting of snow removal operations, etc...). Said accuracy is in effect determined by the pitch at which the temperature sensors are placed along the measuring rod.

Another object of the invention is to provide a device for carrying out said method.

This object is reached according to the invention with a device comprising:

a measuring rod of which at least the lower part is designed to be embedded in the product of which the height is to be measured, said rod being provided with temperature sensors distributed over its height, and detecting and processing circuits, connected to the different sensors, for picking up the signals produced by the sensors and representing the temperature prevailing in the locations of said sensors on the rod, and for comparing the variation in time of the picked-up signals with a pre-set threshold value, in order to provide information representing the height of the product as a function of the results of the comparisons.

BRIEF DESCRIPTION OF THE DRAWINGS

The invention will be more readily understood on reading the following description with reference to the accompanying drawings, in which.

DETAILED DESCRIPTION OF A PREFERRED EMBODIMENT

Figure 1:
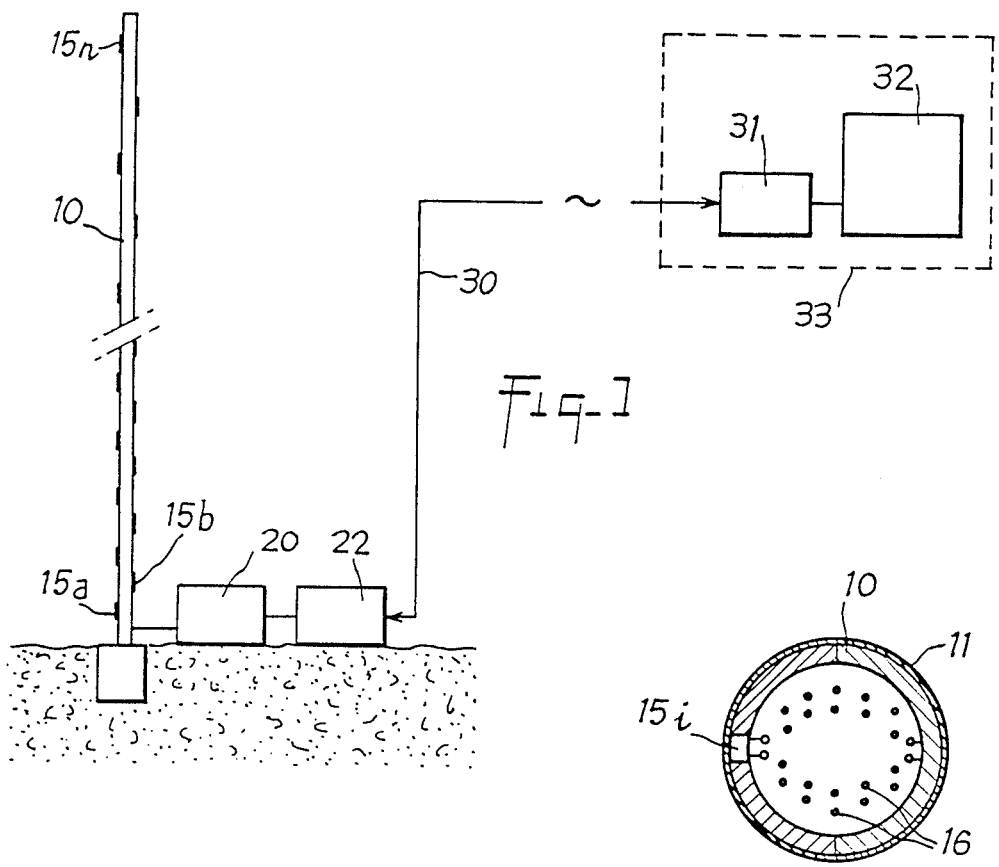
FIG. 1 is a diagrammatical view of an embodiment of the device according to the invention.

FIG. 1 shows a device for measuring the height of snow on the ground. A rod 10 is fixed vertically on the ground. Temperature sensors 15a, 15b, ... 15n are distributed over the height of said rod and are connected via respective wire connectors to a pick-up unit contained in a housing 20 situated at the foot of the rod 10. The signals outputted from the pick-up unit are applied to a transmitting unit 22 for subsequent transmission via connection means 30 to a receiving unit 31 connected with the micro-computer 32 of a central unit 33. The power supply to the sensors and to the pick-up and transmitting units is achieved by way of a battery and-/or a solar panel (not shown).

Figure 2:
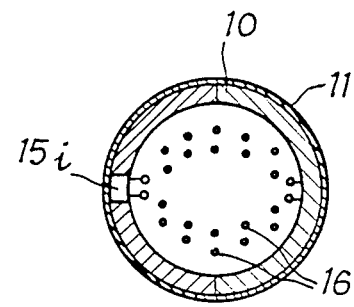
FIG. 2 is a detailed cross-section of a measuring rod forming part of the device of FIG. 1.

As can be seen in FIG. 2, the rod 10 is a tube, on the wall of which the temperature sensors (such as 15i) are fixed in such a way that the sensitive part of said sensors is level with the rod outer surface. Rod 10 is produced for example from plastic material and the sensors are optionally protected by a surface covering formed by a sheath or thin layer of resin 11 of high thermal conductivity. The overall height of the rod 10 and the number and distribution of temperature sensors along that height are selected as a function of the assumed heights of snow to be measured and of the wanted accuracy. By way of indication, the height of the rod is about 3 to 4 m. The sensors are several tens in number. On the lower half of the rod, the sensors can be placed at a regular pitch (such as between 5 and 15 cm) which is smaller than the pitch (for example between 10 and 30 cm) at which the remaining sensors are placed on the upper half of the rod. This disposition makes it possible to improve the absolute accuracy of measurement for the smallest heights of snow. The same result can be obtained with a sensor position pitch which increases regularly from the base of the rod upwards. Supply of the sensors, and/or their connection with the pick-up unit 21 are achieved by means of special wire conductors housed in the central passage of the rod 10. Said conductors may be in the form of individual connecting wires 16, or in the form of a layer of wires, or of a flexible or rigid printed circuit. Preferably, the sensors are not all aligned on the same side of the rod 10 in order to limit the effect of any icing effecting essentially one side of the rod. An alternated disposition of the sensors on two opposite sides of the rod, or along a line describing a spiral on the surface of said rod, can be adopted.

The embodiment considered hereinabove is that of a rod for measuring the height of snow resting on the ground, but of course, in other applications, the height of the measuring rod as well as the number and the disposition of the temperature sensors, can be selected differently. For example, rods of small height can be used for measuring the height of snow over buildings. Then the rod, instead of being fixed to the surface on which the product is piled up, can be suspended to a bracket system, for example for measuring the height of a pulverulent product inside a silo.

Various types of temperature sensors can be used, such as for example thermistors or thermocouples, or even diodes or transistors having conduction properties which vary as a function of the temperature. The use of diodes or of transistors mounted as diodes permits an easy multiplexing of the channels and a reduction in the number of connecting wires by connecting the sensors according to a matrix configuration. The sensors used in the illustrated example are transistors, these normally having characteristics which are less prone to variations than the diodes and being contained in housings permitting a ready mechanical assembly on the rod. Indeed, as illustrated in FIG. 2, the rod is produced in the form of two half-shells of circular cross-section, in which holes are provided for receiving the transistors housings in such a way that the end faces of said housings are levelled with the external surface of the rod. After mounting and wiring of said housings, the half-shells are filled with a heat insulating material and the half-shells are assembled.

As a variant, a rod having a square or rectangular cross-section can be used, said rod being formed by assembling two elements having an L-shaped cross-section.

Figure 3:
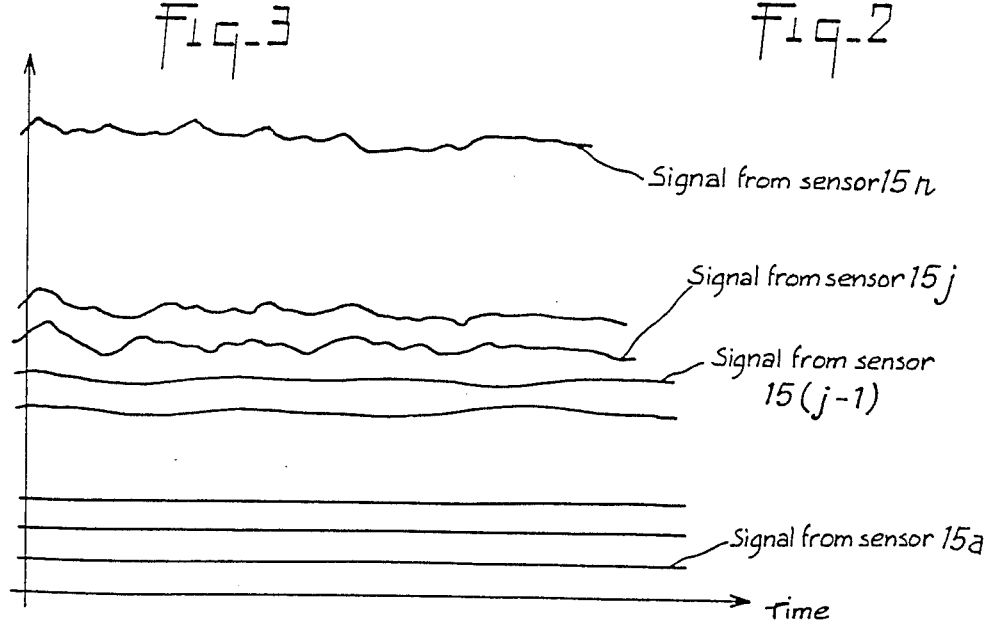
FIG. 3 illustrates waveforms of signals produced by the temperature sensors distributed along the measuring rod.

Whatever the type of temperature sensors used, the signals which they produce represent the temperature at various levels above the ground. Supposing that the ground is covered with a layer of snow of height H comprised between the levels where the sensors 15 ($j-1$) and 15$j$ are placed, the signals produced by the sensors have waveforms such as illustrated in FIG. 3. (In FIG. 3, the origins in ordinates are off-set for those curves representing the signals produced by the different sensors). The signals produced by the sensors situated in the air above the layer of snow, show temperature variations which are either quick or of wide amplitude or both. On the contrary, the signals produced by the sensors situated within the layer of snow show temperature variations which are slow and of relatively small amplitude, and this all the more so as the sensors are sunk deep in the layer of snow.

It is thus possible, by controlling the variation of the signals produced by the sensors, to determine the height of the snow. An embodiment of the circuits for picking-up and processing these signals is now described with reference to FIG. 4.

Figure 4:
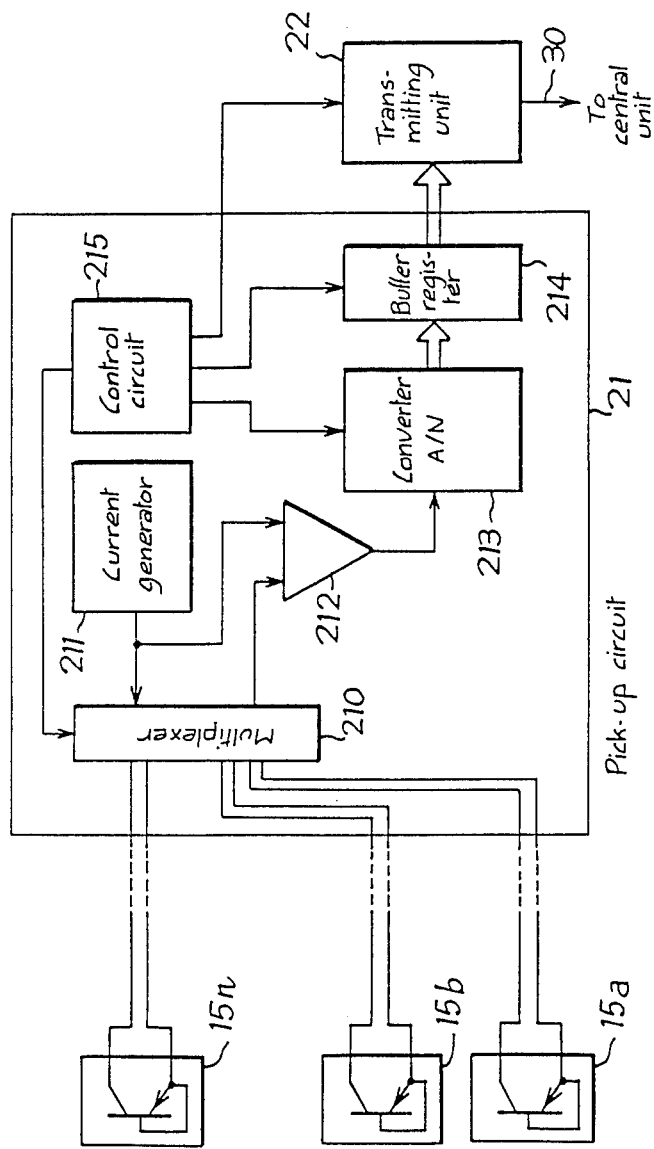
FIG. 4 is a diagram of an embodiment of the circuit used for picking up and processing the signals produced by the temperature sensors.

In the example illustrated in FIG. 4, the temperature sensors are formed by transistors 15$a$, 15$b$, . . . ,15$n$, connected as diodes, each transistor being connected via two wire connectors to the pick-up unit 21. A multiplexer circuit 210 sequentially connects each sensor, on the one hand to a supply circuit 211 which delivers a constant current to one of the wire conductors connected to the sensor and, on the other hand, to an amplifier-adaptor circuit 212 receiving the voltage between the wire conductors connected to the sensor. Any temperature variation of the sensor results in a variation of the voltage picked up under constant current. The output of circuit 212 is connected to an analog-to-digital converter 213 which converts the voltage supplied by the sensor to a digital signal transmitted to a buffer-register 214 wherefrom it can be retrieved in order to be transferred to transmitting unit 22 for subsequent transmission to central unit 33. Supply of the circuits of the pick-up unit and of the current generator 211 is provided by a battery (not shown). It would be possible as a variant, to provide a source of electrical power using solar panels. A circuit 215 controls the operation of multiplexer circuit 210 and of converter 213, as well as the writing and reading in registers 214 and the operation of transmitting unit 22.

Any conventional digital data transmission system can be used to realize the transmitting, receiving and connection units 22, 31 and 30.

Figure 5:
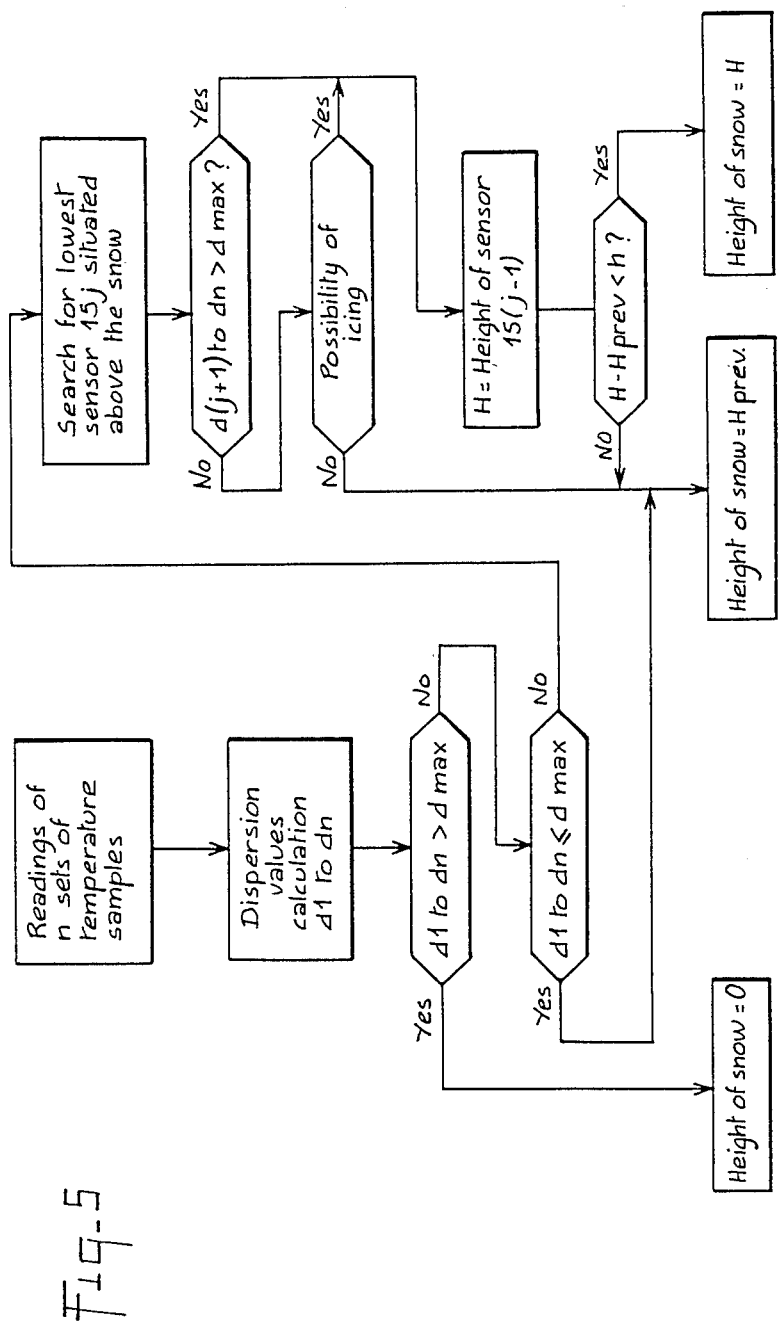
FIG. 5 is a flow chart of the operations carried out during the processing of the signals produced by the temperature sensors.

The received digital data is stored in a random access memory of micro-computer 32 of the central unit for subsequent processing. Such processing is carried out under program control and generally consists in monitoring the variation of the temperature measured by each one of the sensors. The main steps of the processing are illustrated in the flow chart of FIG. 5.

For every signal produced by a sensor, a set of amplitude values recorded periodically (by control of the multiplexer circuit) is monitored over a given period of time. By way of indication, the temperature signal of a given sensor is sampled every 0.5 seconds and a statistical processing is conducted on a set of 128 successive samples. The statistical processing consists in monitoring the dispersion of the values composing the set being monitored. For example, the dispersion can be characterized by calculating the standard deviation.

When the dispersion characteristics d1, d2, . . . , dn have been calculated for the n sensors over a given period, they are then successively compared to a maximum threshold value dmax.

The threshold value dmax can be determined experimentally; it can vary depending on the duration of the reading period of the sets of samples.

If all the dispersion values d1, d2, ..., dn are above dmax, the height of the snow is 0 (H=0) and the process is repeated for processing all the amplitude values obtained through the next period of time.

If all the dispersion values d1, d2, ..., dn are below or equal to dmax, then the previously measured height of snow is retained (Hprev.).

If some of the dispersion values are above dmax and others are below or equal to dmax, then it proceeds to a search through the dispersion values above dmax for the value which corresponds to the lowest situated temperature sensor, in order to identify the first sensor 15j which obviously is situated above the layer of snow.

As a verification, the dispersion values d(j+1) to dn corresponding to sensors 15 (j+1) to 15n situated above the sensor 15j, are checked. If all the dispersion values d (j+1) to dn are above dmax, then the height of snow retained is the height of sensor 15 (j−1) situated immediately below sensor 15j. If some of the dispersion values d (j+1) to dn are below or equal to dmax, and to account for a possible icing effect, the height of sensor 15 (j−1) can be retained as height of the snow if the sensors situated above and for which the dispersion values are not above dmax, are all situated on the same side of the measuring rod (for example if they are all sensors of an odd row or sensors of an even row when the sensors are located in alternate manner on two opposite sides of the rod). In the opposite case, the height of sensor 15 (j−1) is not validated and the previous value is retained as height of the snow (H=Hprev.).

As an additional verification, and when a new value H has been determined, it will be possible to compare that value with the previous value Hprev. in order to definitely validate the new value H if the difference between H and Hprev. remains below a pre-set threshold value h, a snowfall of height h being considered as impossible during the period of time in which all the temperature readings required for calculating the dispersion values are made. If a deviation higher than or equal to h is found, then the previous value Hprev. is retained.

The method described hereinabove makes it possible to estimate the height of the snow with an absolute accuracy determined by the interval between the sensors on the rod. Such accuracy is generally sufficient for the proposed applications (the opening or closing of roadways or of ski runs, or the start of a snow-removal operation).

Insofar as a pattern of the thermal behaviour of the measuring rod has been made, accuracy can be improved by interpolating the height of the highest sensor for which the temperature dispersion is below or equal to a selected threshold with the height of the lowest sensor for which the temperature dispersion is below the selected threshold.

The foregoing description has considered the processing of signals in the central unit from digital data received. However, given the large number of measured values, a pre-processing (for example data compression, first computations), can be conducted on the site where the measuring rod is implanted, and the pre-processing results will be sent to the central unit to work out the height of the now.

What is claimed is:

1. A method for measuring the height of a product in surroundings having a different thermal behavior from that of the product, and particularly for measuring the height of snow on the ground, wherein said method comprises the following steps:

providing a measuring rod of which at least the lower part is designed to be embedded in the product of which the height is to be measured, said rod being provided with a plurality of temperature sensors distributed over the height of the rod, picking up, at time intervals, signals delivered by the sensors and representing the temperatures prevailing at the locations of the different sensors on the rod, processing the picked up signals in order to determine the values of a characteristic representative of the variation in time of the temperature at different locations corresponding to the locations of the temperature sensors, respectively, and comparing each one of the determined values with a threshold value in order to identify the lowest situated sensor for which the determined value of said characteristic exceeds the threshold value, whereby the height to be measured can be provided as a result of the identification of said lowest situated sensor.

2. A method as claimed in claim1, wherein, for every sensor, a set of values representing the periodically measured amplitude of the signal produced by the sensor, is recorded, and the value of a statistical characteristic representing the dispersion of the recorded values is worked out by statistically processing said recorded values, to be compared to said threshold value.

3. A method as claimed in claim 1, wherein said characteristic representative of the variation in time of the temperature is selected from the instantaneous speed of temperature variation, the amplitude of temperature variation over a given period, and the dispersion of temperature values periodically measured during a given time period.

4. A device for measuring the height of a product in surroundings having a different thermal behavior from that of the product, and particularly for measuring the height of snow, said device comprising:

a measuring rod of which at least the lower part is designed to be embedded in the product of which the height is to be measured, said rod being provided with temperature sensors distributed over its height, and detecting and processing circuits, connected to the different sensors, for picking up the signals produced by the sensors and representing the temperature prevailing in the locations of said sensors on the rod for determining the values of a characteristic representative of the variation in time of the temperature at different heights corresponding to the locations of the temperature sensors, respectively, and for comparing each one of the determined values with a threshold value in order to identify the lowest situated sensor for which the determined value of said characteristic exceeds said threshold value, whereby the height to be measured can be provided as a result of the identification of said lowest situated sensor.

5. A device as claimed in claim 4, wherein the detecting and processing circuits comprise means for recording over a given period of time and for every sensor, a set of values representing the periodically measured amplitude of the signal produced by the sensor, means for working out the value of a statistical characteristic representing the dispersions of the values recorded for every sensor, and means for comparing each worked out dispersion characteristic with said threshold value.

6. A device as claimed in claim 4, wherein the temperature sensors are placed on the measuring rod in such a way as not to be all aligned on one side of said rod.

7. A device as claimed in claim 4, wherein the measuring rod is tubular and the temperature sensors are fixed in passages formed through the wall of the rod and are connected to the detecting and processing circuits via wire conductors housed in the central passage of the rod.

8. Device as claimed in claim 4, wherein the detecting and processing circuits comprise analog-to-digital converting means connected to the sensors in order to produce digital data representing the amplitudes of the signals delivered by the sensors, a transmission system for transmitting the digital data, or digital information worked out therefrom to a central unit, and computing means for determining the desired height from said digital information.

* * * * *